US008614806B2

(12) United States Patent
Brewington

(10) Patent No.: US 8,614,806 B2
(45) Date of Patent: Dec. 24, 2013

(54) SYSTEMS AND METHODS FOR PRINTING HYBRID RAISED MARKINGS ON DOCUMENTS TO ENHANCE SECURITY

(75) Inventor: Grace T. Brewington, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 141 days.

(21) Appl. No.: 13/410,974

(22) Filed: Mar. 2, 2012

(65) Prior Publication Data
US 2013/0229692 A1 Sep. 5, 2013

(51) Int. Cl.
| H04N 1/387 | (2006.01) |
| H04N 1/44 | (2006.01) |
| H04N 1/56 | (2006.01) |
| G06K 15/02 | (2006.01) |
| H04N 1/00 | (2006.01) |

(52) U.S. Cl.
CPC ........ H04N 1/00864 (2013.01); G06K 15/1872 (2013.01); G06K 15/1878 (2013.01)
USPC .......... 358/1.14; 358/2.1; 358/3.28; 358/515; 358/530; 283/114

(58) Field of Classification Search
USPC ............... 358/1.13, 1.14, 1.15, 2.1, 3.28, 1.9, 358/3.06, 515; 382/103, 112, 159, 165, 382/100, 218, 238
See application file for complete search history.

(56) References Cited

U.S. PATENT DOCUMENTS

| 4,033,059 | A | * | 7/1977 | Hutton et al. | 283/91 |
| 6,085,903 | A | * | 7/2000 | Jotcham et al. | 283/91 |
| 7,278,792 | B2 | * | 10/2007 | Takada et al. | 400/109.1 |
| 7,468,842 | B2 | * | 12/2008 | Steenblik et al. | 283/72 |
| 7,763,179 | B2 | * | 7/2010 | Levy et al. | 283/113 |
| 7,925,043 | B2 | | 4/2011 | Kazmaier et al. | |
| 2010/0053287 | A1 | | 3/2010 | Belelie et al. | |
| 2010/0055407 | A1 | | 3/2010 | Belelie et al. | |
| 2010/0055415 | A1 | | 3/2010 | Belelie et al. | |
| 2010/0055423 | A1 | | 3/2010 | Chretien et al. | |
| 2010/0055484 | A1 | | 3/2010 | Chretien et al. | |

OTHER PUBLICATIONS

Bryan J. Roof; U.S. Appl. No. 13/411,038, filed Mar. 2, 2012.

* cited by examiner

*Primary Examiner* — Scott A Rogers
(74) *Attorney, Agent, or Firm* — Ronald E. Prass, Jr.; Prass LLP

(57) ABSTRACT

Haptic security features, which are generally not visually perceptible or reproducible, are applied on a surface of a substrate according to a predetermined scheme. The haptic security features are complemented by visual features that bear a relationship to the haptic security features, and/or otherwise to features of an underlying image that is already printed on the substrate. One or more colored ink layers that includes characters or other features that bear a relationship to the haptic security features is embedded into the haptic security features on the surface of the substrate to form a composite security feature that has visual information as well as haptic response. Haptic security features are based on redundantly encoding features that are pre-printed on the substrate in a preliminary step of forming a visual image on the substrate by overprinting portions of the underlying pre-printed image related to the haptic security features.

20 Claims, 3 Drawing Sheets

SYSTEMS AND METHODS FOR PRINTING HYBRID RAISED MARKINGS ON DOCUMENTS TO ENHANCE SECURITY

This application is related to U.S. patent application Ser. No. 13/411,038 entitled "Systems And Methods For Forming Raised Markings On Substrates For Braille Identification And Security And To Facilitate Automatic Handling Of The Substrates," which is filed on a same day as this application, is co-owned with this application, and the disclosure of which is hereby incorporated by reference herein in its entirety.

BACKGROUND

1. Field of Disclosed Subject Matter

This disclosure relates to systems and methods for using marking materials, including ultraviolet curable gel inks, and variable data digital printing methods to produce composite, redundant or special encoding on banknotes, documents of value and packaging by combining visual information with haptic printing and/or providing redundant encoding via haptic printing to produce redundant encoding and custom markings.

2. Related Art

The U.S. Government, like other governments world-wide, prints "paper" currency for use in domestic and international trade transactions. Paper currency, like many other forms of printed documents that have an intrinsic monetary value ("documents of value"), is historically a target of forgers or counterfeiters. The forgers or counterfeiters painstakingly produce or reproduce copies of the documents of value and then attempt to pass the forgeries off as original and genuine documents of value.

The existence and use of counterfeit currency can have economically devastating effects. Because of this, governments expend significant resources to make forgery and counterfeiting of currency incredibly difficult. Historically, efforts to counter forgery or counterfeiting of currency and other documents of value often involved the inclusion of increasingly sophisticated fine details in the printing of the currency or other documents. These fine details were designed in a manner that they were not easily reproducible according to traditional document production or reproduction printing methods. An objective of anti-forgery and anti-counterfeiting methods and techniques was to include printed details in the produced documents of value that were easily recognizable such that the absence of these printed details could be readily detected by simple visual inspection of the documents of value by virtually any observer on careful inspection of the documents of value.

The widespread availability of all manner of increasingly sophisticated image forming devices, such as printers and copiers, which are capable of producing and reproducing extremely high quality color copies of original authentic documents, has rendered obsolete many of the more simplistic, traditional anti-forgery or anti-counterfeiting methods and techniques. Digital printers, copiers and scanners, coupled with sophisticated image editing software, make it possible to produce unauthorized high-quality copies of legitimate documents of value, including currency, that are increasingly difficult to distinguish from genuine original documents. In other words, developments made in computer and photocopying technologies have made it possible for individuals with very little training, and comparatively little effort, to easily copy documents of value, including currency. The quality of these unauthorized imitations, in many instances, makes them all but impossible to distinguish from genuine documents, when the only features that may be used to distinguish the copies from the originals are content of the printed image.

Government agencies and corporate entities responsible for the generation and control of all manner of documents of value, including currency, combat increasingly sophisticated counterfeiting techniques by employing equally increasingly sophisticated marking methods that remain directed at the objective of including details in the printed documents the absence of which may be easily detectable. Among the techniques that have been implemented are the use of increasingly sophisticated graphic designs, holograms, multiple and unique color schemes and shading, watermarking strips embedded in document substrates, other embedded identification devices, micro-printing techniques and inks that appear to the visual inspector to change color depending on an angle at which ambient light is reflected off the surface of the document.

This game of cat and mouse continues. Counterfeiters and forgers continue to seek new and unique ways of stymieing all efforts to stop them. In an effort to avoid the inclusion of embedded watermarks, for example, in the substrates on which US currency is printed, counterfeiters and forgers have been known to apply a deinking process, for example, to five dollar bills and to reprint them with the markings of hundred dollar bills in order to attempt to pass the counterfeits off as genuine hundred dollar bills. A quick visual inspection may reveal the embedded watermarking strip without recognizing that the displayed the domination and the information presented on the embedded watermarking strip do not match.

In ongoing efforts to stifle forging and counterfeiting, some countries have turned to the use of for example, advanced printing and security techniques in the form of polymer banknotes. Introduced first in Australia in the late 1980s, it is estimated that more than 25 countries worldwide employ such polymer banknotes. Canada, in 2011, began issuing polymer banknotes that include detailed anti-forgery and anti-counterfeiting features. Among these are certain raised features that, in addition to providing a heightened level of security for the documents, also provide distinguishing "haptic" or "tactilely discernible" characteristics on the surface of the banknotes by which visually impaired individuals can distinguish, for example, different denominations of the banknotes by touch.

While currency represents perhaps the most commonly understood and commonly used form of value documents that are the target of forgers and counterfeiters based on its widespread circulation and every day use, other examples of documents of value include lottery tickets, traveler's checks, and commercial tickets for transportation and leisure activities. A non-exhaustive list of these latter categories of tickets includes airline tickets, cruise tickets, sporting event tickets, concert tickets and tickets for admission to large theme parks. Commercial enterprises that deal with tickets as forms of documents of value seek to apply similar techniques to those employed by governments in protecting their currency to avoid unauthorized copying of their documents of value. Many of these commercial enterprises choose to encode authenticating information as individual barcodes, or glyph elements, for example, either of which may be machine scanned and authenticated at a point of entry or point of embarkation, as appropriate. These enterprises also use authenticating information embedded in a design on the face of the document that is printed in such a manner as to allow the design to catch light differently when the document is tilted, sometimes resulting in a different image being discernible altogether.

The objective of anti-forgery and anti-counterfeiting techniques and methods, regardless of the form they take, remains to provide a simple manner by which to verify the authenticity of a document of value with inclusion of features that may or may not be visually discernible, or are otherwise very difficult to reproduce, in order that an unauthorized reproduction of a document of value can be distinguished from a genuine document.

SUMMARY OF THE DISCLOSED EMBODIMENTS

Currency and other documents that are augmented with haptic or tactile features provide significant advantages in security of the documents, and in document discrimination to, for example, visual inspectors, that are not realized in documents that do not include such haptic or tactile features. See, e.g., co-owned U.S. Pat. No. 7,925,043 B2, and co-owned U.S. Patent Application Publication Nos. 20100053287, 20100055407, 20100055415, 20100055423 and 20100055484.

Typical in the prior art is that haptic or tactile features are formed by building up or enhancing portions of an underlying image with additional layers of for example, the marking material that is used to form the image. See, e.g., co-owned U.S. Pat. No. 7,925,043 B2 referenced above. These haptic or tactile features tend to be formed independently and in a specific location on one or the other faces of the currency or other document of value substrate based on an ease in consistently printing regular images and haptic or tactile features in a same position on each substrate. Co-pending U.S. patent application Ser. No. 13/494,098 describes the positing haptic or tactile features at different positions on the surface of the substrate in order to ensure that stacks of currency or other substrates remain compatible with mechanisms for automatic processing of the substrates, for example, in commerce.

As efforts to frustrate forgers and counterfeiters become more sophisticated, there remains a desire for relative ease in the production process and relative simplicity for inspectors that are presented with the documents of value to confirm their authenticity. It would be advantageous, therefore, to provide marking schemes that would uniquely combine the application of haptic security features that may or may not be visually perceptible to humans or scanning devices with specific corresponding visual enhancements as marks that provide a basis for further visual inspection of currency and other documents of value.

Exemplary embodiments according to this disclosure may provide relatively simple mechanisms whereby haptic security features, which are generally not visually perceptible or reproducible, are applied to a face of a substrate according to a predetermined scheme, and the haptic security features are then complemented by visual features that may bear a relationship to the haptic security features, or otherwise to features of an underlying image that may already be pre-printed on the substrate.

Exemplary embodiments may provide a mechanism whereby one or more colored ink layers is embedded into a generally transparent haptic security marking disposed on the surface of a substrate. The one or more colored ink layers may include characters or other features that bear a relationship to the haptic security features, which may generally be printed using clear gel inks in order to (1) generally not obscure an underlying image on the substrate, and (2) generally not be reproducible by, for example, scanning the image on the underlying substrate with a conventional scanner. In this manner, exemplary embodiments may form a composite security marking that has visual information as well as haptic response. In instances where a relationship is established between the visual information and the haptic security marking, the exemplary embodiments provide an opportunity for a simple cross check of the included features by a combination of visual and haptic inspection techniques.

Exemplary embodiments may provide a mechanism whereby a haptic security feature deposited on a surface of a substrate may be based on redundantly encoding a feature that is already pre-printed on the substrate in a preliminary step of forming a visual image on the substrate. For example, a pre-printed substrate may be scanned to pick up one or more features that were initially pre-printed on the substrate such as, for example, one or more digits in a serial number of a banknote, or one or more other easily discernible, and reproducible, features of the banknote including other digits such as the year of printing. These standard features may then be reproduced and printed as haptic security features using, for example, clear gel inks in order again that a simple cross check may be undertaken between visual features in an image on a substrate and less visible features in the haptic security features added to the substrate. Any portions of an underlying printed image that can be scanned and reproduced using clear gel inks as haptic security features are contemplated.

Exemplary embodiments may provide a mechanism whereby the haptic security features are applied to currency or other substrates with a clear ultraviolet (UV) curable gel ink such that the haptic security features may be presented on the substrate without obscuring all or significant portions of an underlying pre-printed image on the substrate.

Exemplary embodiments may include a scanning device as an image source that may scan pre-printed substrates, detects a specific feature of the pre-printed image on the pre-printed substrate, extract that feature as a specific feature to be reproduced in some related manner as a haptic security feature overlying the pre-printed image on the substrate in order to provide a unique haptic security feature related to the underlying pre-printed image that provides an easy mechanism by which an inspector can compare visual features and haptic features to verify authenticity of the document printed on the substrate, to include currency.

Exemplary embodiments may enhance the extracted feature discussed above in order that redundant haptic feature crosschecks are provided.

Exemplary embodiments may combine the above-described methods for producing composite and redundant encoding of visual and haptic security features on the surface of the substrate to enhance the ability of an inspector to more easily discern the existence of a forged or counterfeit document of value.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for using marking materials, including ultraviolet curable gel inks, and variable data digital printing techniques, to produce composite, redundant or special encoding on banknotes, documents of value and packaging by combining visual information with haptic printing and/or providing redundant encoding via haptic printing to produce redundant encoding and custom markings, will be described, in detail, with reference to the following drawings, in which.

DETAILED DESCRIPTION OF THE DISCLOSED EMBODIMENTS

Figure 1:
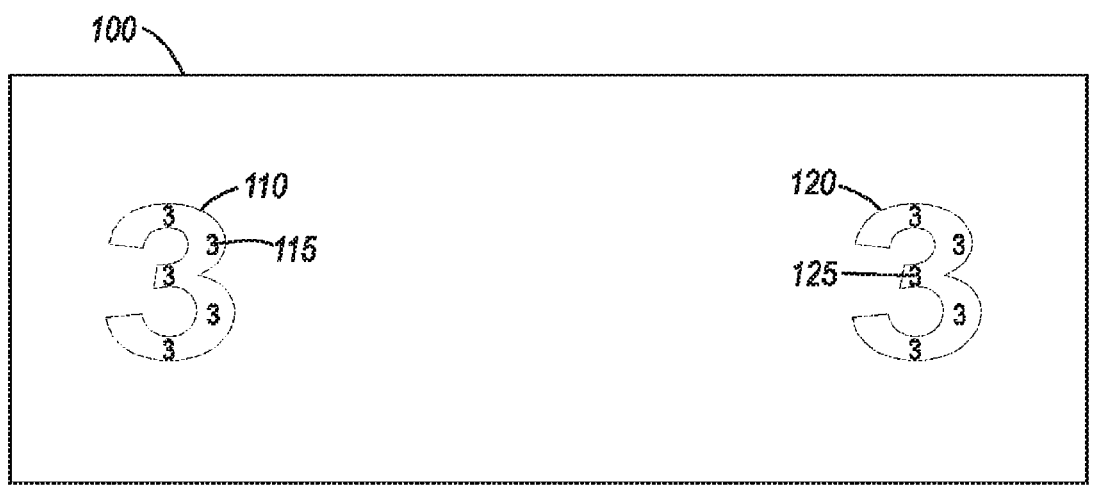
FIG. 1 illustrates an exemplary overview of a composite security marking scheme for including visual and haptic security markings on a surface of a document of value such as, for example, currency, or other substrates on which a document of value may be printed, according to this disclosure.

The systems and methods for using marking materials, including ultraviolet curable gel inks, and variable data digital printing techniques, to produce composite, redundant or special encoding on banknotes, documents of value and packaging by combining visual information with haptic printing and/or providing redundant encoding via haptic printing to produce redundant encoding and custom markings according to this disclosure will generally refer to these systems and methods as being particularly useful in enhancing security of the banknotes, documents of value and packaging. The enhancements in security are generally achieved by providing detailed combinations of visual and haptic markings, some of which may be potentially related to each other according to a determined or defined relationship. These detailed combinations of visual and haptic markings may provide an inspector with an ability to quickly determine whether the banknotes, documents of value and packaging are genuine, or may be potentially forgeries or counterfeit. Exemplary embodiments described and depicted in this disclosure should not be interpreted as being specifically limited to any particular configuration of devices, to any particular combination of visual and haptic features disposed on the substrate or to any particular intended use that may be considered to limit the claimed subject matter.

Specific reference to, for example, an image forming device throughout this disclosure should not be considered as being limited to any particular type of image forming device including, for example, any of a printer, a copier, a scanner or a multi-function device, or to any particular configuration of one or more of these devices in communication with each other to carry into effect the composite and/or redundant security marking schemes according to this disclosure.

Exemplary embodiments will be described as being particularly adaptable to use in printing and/or copying devices that may be used to first scan a pre-printed substrate to extract details of the image pre-printed on the substrate. Exemplary embodiments may employ inkjets in adaptable printing and/or copying devices to jet UV curable gel inks onto a substrate to provide raised haptic security features (also referred to as "raised marks" and "raised security marks") that may include certain visual enhancements, but the disclosed systems and methods should not be construed as being necessarily limited to only these types of devices or to the use of jetted inks. Rather, any deposition device that may be employed to dispose, on the surface of the substrate, a marking material that may be built up to produce haptic security features, which may or may not include corresponding visual enhancements, is contemplated.

The systems and methods according this disclosure may use known methods such as, for example, ink jet printing to deposit a radiation curable gel ink, including a UV curable gel ink, on a substrate. Examples of these known methods are described, for example, in U.S. Patent Application Publication No. 20100055423, which is commonly assigned, and the disclosure of which is hereby incorporated herein by reference in its entirety. The disclosed ink jetting method may employ a common inkjet printing device with, for example, multiple scanning heads and an LED curing bar attached, but there are many potential architectures for the devices.

Exemplary embodiments according to this disclosure may be particularly distinguished as including one or more of the following features. In exemplary embodiments, processes, materials and systems are provided for inkjet security marking of substrates using clear UV curable gel inks to provide composite haptic security markings with visual information embedded into the haptic security markings. Custom markings may be provided to distinguish batches of substrates such as, for example, banknotes to facilitate bulk tracking of a batch of the banknotes. Additionally, or alternatively, redundant encoding of information otherwise visually printed on the substrate may inform the format and/or content of the haptic security marking using data file input for variable data that may be independently generated, or otherwise scanned to generate the data file input.

FIG. 1 illustrates an exemplary overview of a composite security marking scheme for including visual and haptic security markings on a surface of a document of value such as, for example, currency, or other substrates on which a document of value may be printed, according to this disclosure. As shown in FIG. 1, a document substrate 100 may have printed on it one or more haptic security features 110,120, which may be presented by building up, as raised marks, depositions of a clear marking material such as, for example, a clear UV curable gel ink. The use of clear marking materials is intended to at once defeat any attempt to copy the marks using conventional copier or scanner technologies, while also presenting the haptic security features, covering comparatively large areas on the substrate, in a manner that does not obscure underlying pre-printed material on the substrate.

The one or more haptic security features 110,120 (shown as the outlined "3s" in FIG. 1) may be augmented by using one or more colored ink layers to embed separate visual markings 115,125 in the one or more haptic security features 110,120 deposited on the surface of the substrate. Those of skill in the art recognize that the use of conventional techniques such as, for example, inkjet printing to deposit multiple layers of marking material, including clear UV curable gel inks, on a surface of a substrate provides an opportunity to separately print at least one layer of visual markings among the multiple layers of clear marking material in a manner that, as finally produced, the built up haptic security features will have, embedded in their structure, the at least one layer of visual markings.

As shown in FIG. 1, the separate visual markings 115,125 of the one or more colored ink layers may include characters or other features that bear a relationship to the one or more haptic security features 110,120 within which they are embedded (Note the smaller "3s" separate visual markings embedded in the outlined "3s" as the clear haptic features shown in FIG. 1). In this manner, a composite security marking may be formed that has visual information as well as haptically-detectable information. In embodiments such as that shown in FIG. 1, where a relationship is established between the visual information and the haptically-detectable information, an individual that is attempting to establish authenticity of a document of value such as, for example, currency, is provided with a simply discernible cross check of the included features. Such composite markings, based on their composition, will (1) further defeat attempts by counterfeiters or forgers to reproduce the documents by simple, and even more sophisticated, copying schemes, while (2) easing a burden on inspector to distinguish unauthorized copies of documents from genuine originals.

It should be noted that, although FIG. 1 depicts an exemplary embodiment in which the respective content of the visual information and the haptically-detectable information is the same, such need not always be the case. Any scheme that may relate a particular characteristic of the content of the visual information with the content of the haptically-detectable information in a manner that can be easily defined and understood is contemplated.

Figure 2:
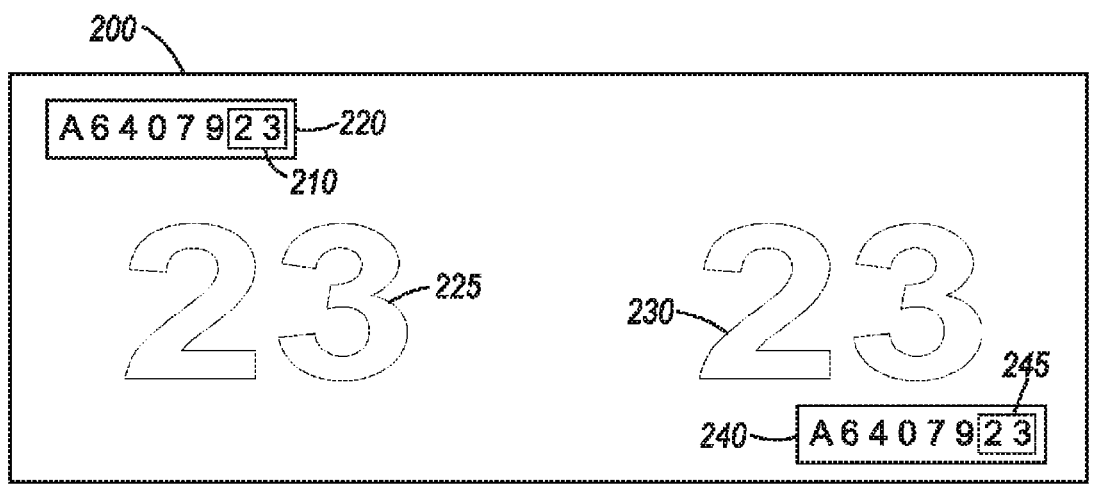
FIG. 2 illustrates an exemplary overview of a redundant security marking scheme for including related visual and haptic security markings on a surface of a document of value such as, for example, currency, or other substrates on which a document of value may be printed, according to this disclosure.

FIG. 2 illustrates an exemplary overview of a redundant security marking scheme for including related visual and haptic security markings on a surface of a document of value such as, for example, currency, or other substrates on which a document of value may be printed, according to this disclosure. As shown in FIG. 2, the document substrate 200 may have printed on it one or more haptic security features 210, 230 that, in the same manner as in the exemplary embodiment shown in FIG. 1, may be presented by building up, as raised marks, depositions of a clear marking material such as, for example, a clear UV curable gel ink, for the reasons and benefits discussed above.

The one or more haptic security features 210,230 (shown as the outlined features "23" in FIG. 2) may be based on redundantly encoding a feature that is already pre-printed on the substrate 200 in a preliminary step of forming a visual image on the substrate 200. As shown in the exemplary embodiment in FIG. 2, the substrate 200 may have pre-printed on it one or more images such as, for example, a serial number 220,240 by which the substrate, which may be currency or another document of value, may be identified. A scanning device may be used to scan the images on the pre-printed substrate 200. A system associated with the scanner may then be used to isolate one or more features from the images that were initially pre-printed on the substrate such as, for example, one or more digits 225,245 in the serial number 220,240. The isolated one or more features may then be extracted by the system associated with the scanner to be reproduced and overprinted on the substrate as the one or more haptic security features 210,230 using, for example, clear gel inks in order again that a simple cross check may be undertaken between visual features in an image on a substrate and less visible features in the haptic security features that are not easily picked up by a scanner.

As shown in FIG. 2, the haptic security features 210,230 bear a specific relationship to isolated one or more digits 225,245 ("23" shown in FIG. 2) of the serial number 220,240 pre-printed on the substrate 200. In the manner shown, a direct relationship is defined between aspects of the visual features and the haptic security features 210,230. Such a direct relationship as that shown will aid in identifying each individual substrate, but may make printing multiple substrates difficult. Selecting rather the initial characters in a pre-printed serial number, such as the "A64," or simply the digits "64," as shown in the example in FIG. 2, may ease the burden of reproducing haptic security features 210,230 on a group of substrates in a manner that balances security and convenience. Also, the above discussion should not be read to limit the disclosed subject matter to imply that the reproduced haptic security features 210,230 bear a direct correlation to the scanned elements. Any easily discernible, and reproducible, feature of a pre-printed substrate such as, for example, the digits referring to the year of printing of a banknote may be isolated, extracted as digital information, and may be further processed according to some simple algorithm to arrive at a format for the haptic security features 210,230 that may be overprinted on the substrate.

Additionally or alternatively, in order to aid in identification of correlating features, the pre-printed features on the substrate, such as the digits "23" in the serial numbers 220, 240 shown on the example substrate 200 in FIG. 2, may themselves be overprinted with additional layers of marking material to provide some level of visual or haptic differentiation from the rest of the pre-printed substrate in a manner that may assist a visual inspector in quickly discerning which pre-printed features are reproduced as the haptic features on the particular substrate.

It should be understood that either of the above exemplary security marking schemes, or combinations of these exemplary security marking schemes, may be employed in specific instances that aid in relatively quick and/or relatively simple identification a particular document of value or bill as being authentic. These schemes may also be employed in other more detailed and/or more specific marking scenarios. For example, custom markings may be formatted and applied to specific groups of documents such as, for example, batches of banknotes, in order to provide governments or other entities an ability to more easily track locations where individual documents or collections of documents belonging to the specifically-marked groups of documents may appear in the U.S. or worldwide. The custom markings could, for example, correspond with a particular project code assigned to the tracking of a specific group of documents. In other words, in scenarios such as these, the custom markings may bear no relationship to any of the information pre-printed on the substrates, but rather may be used for independent identification of the documents of value by a specific entity that directs the placement of the security markings on the substrates.

Figure 3:
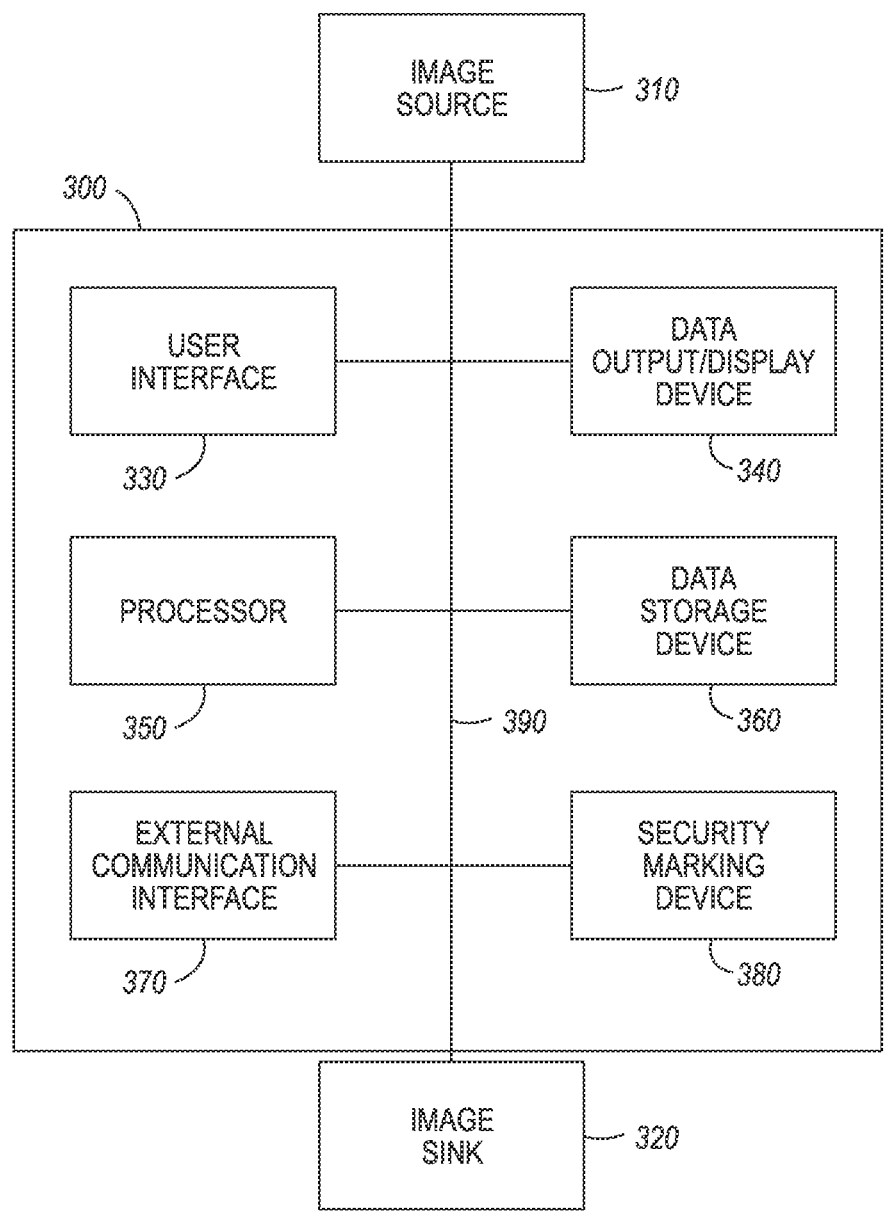
FIG. 3 illustrates a block diagram of an exemplary system for carrying into effect at least one of the composite or redundant security marking schemes for printing visual and/or haptic security markings on the surface of a document of value according to this disclosure.

FIG. 3 illustrates a block diagram of an exemplary system 300 for carrying into effect at least one of the composite or redundant security marking schemes for printing visual and/or haptic security markings on the surface of a document of value according to this disclosure. Portions of the exemplary system 300 shown in FIG. 3 may be housed in, or attached to, a particular image forming device. The particular image forming device may be a combined image forming device that also prints detailed images on the substrate, or maybe a separate image forming device either downstream of, or not in any way positionally, or directly functionally, associated with, the image forming device that prints detailed images on the substrate.

The exemplary system 300 may include an image source 310 by which image information may be input into the exemplary system 300. Image source 310 may be an integral component of the exemplary system 300, or may be an external unit connected to and in wired or wireless communication with the exemplary system 300. Image source 310 may be any form of image receiving and/or image forming device such as, for example, an image scanning device. In embodiments, the image source 310 may be any device or mechanism by which pre-printed substrates, including documents of value such as, for example, currency, may be scanned and information regarding images existing on the pre-printed substrates may be input to the exemplary system 300. In embodiments, the image source 310 may be a locally or remotely located computer or other user workstation that is capable of aiding a user in generating or reproducing electronic digital source image data.

Exemplary system 300 may include an image sink 320 by which modified substrates may be printed, or overprinted, and ultimately output from the exemplary system 300 including combinations of visual image information pre-printed, printed or over printed on a substrate with composite or redundant security markings according to this disclosure. In embodiments, therefore, the image sink 320 may be an ink jet printing device or inkjet print head that is used to deposit clear gel inks such as, for example, UV curable clear gel inks, in layers on the substrate to provide haptic security markings. In embodiments, layers of the clear gel inks will be interspersed with one or more color ink layers, the color ink layers being formatted to present visual security markings in a manner that those visual security markings will ultimately be embedded in the haptic security markings in the finished product.

Although preferred embodiments may include the use of clear gel inks to produce the haptic security features, it should be recognized that other marking materials that are built up on the surface of the substrate may be used in place of clear gel inks to provide the haptic security markings on the finished substrates.

The exemplary system 300 may include a user interface 330 by which a user may communicate with the exemplary system 300. The user interface 330 may be housed, and used, in conjunction with an associated data output/display device 340 as a stand-alone user interface/display device combination associated only with the operation and functioning of the exemplary system 300. The user interface 330 and the data output/display device 340 may be housed in the image source 310 when the image source 310 comprises a locally or remotely located computer or other user workstation that is capable of aiding a user in generating or reproducing electronic digital source image data. Otherwise, the user interface 330, in association with the data output/display device 340, may be incorporated as a portion or function within a graphical user interface (GUI) of the image forming device.

Regardless of its positioning, the user interface 330 may be configured as one or more conventional mechanisms common to computing devices such as, for example, a user's workstation, or otherwise common to image forming devices, that permit the user to input information to the exemplary system 300, or otherwise to manipulate input digital data that may be displayed on the data output/display device 340 when such input digital data is input to the exemplary system 300 via, for example, scanning image information pre-printed on a scanned input substrate. The user interface 330 may include, for example, a conventional keyboard and mouse, a touchscreen with "soft" buttons or with various components for use with a compatible stylus, a microphone by which a user may provide oral commands to the exemplary system 300 to be "translated" by a voice recognition program, or other like device by which a user may communicate specific operating instructions to the exemplary system 300.

The user interface 310 may be employed by the user to provide specific instructions to the exemplary system 300 to carry out functions that may include generating a digital data file, or otherwise manipulating a digital data file that is generated from the image source 310 to direct deposition of one or more specific marking materials to provide haptic security marks on the surface of a substrate that may or may not be visually perceptible, or that may or may not be enhanced with specifically-included (embedded) augmenting visual security marks.

The data output/display device 340 may comprise any conventional means by which to display relevant data regarding the functioning of the exemplary system 300, and may provide the user, in conjunction with the user interface 330, a means to interactively communicate with, and control, the specific security marking formatting functions of the exemplary system 300 by displaying images representative of the digital data received from the image source 310, or images of digital data that may be generated according to a user input via the user interface 330, or image of digital data that may be pre-stored in the exemplary system 300.

The exemplary system 300 may include one or more local processors 350 for individually operating the exemplary system 300 and carrying out the portions of the security marking forming functions for manipulating input digital data and images for formatting haptic security marks, which may or may not be visually enhanced, to be printed on a substrate under the control of the exemplary system 300. Processor(s) 350 may include at least one conventional processor or microprocessor that may be provided to interpret and execute instructions in cooperation with other system components for obtaining input digital image information from an image source 310, obtaining generated digital image information from a user interface 330 or otherwise, obtaining user input regarding specific security marking features to be printed on an output substrate by the image sink 320 and directing the depositing of marking materials such as, for example, clear gel inks on the surface of substrates to provide haptic security marks.

The exemplary system 300 may include one or more data storage devices 360 that may be used to store relevant data, and/or such operating programs as may be used by the exemplary system 300, and specifically the processor(s) 350, to carry into effect the exemplary security marking schemes described in this disclosure. At least one data storage device 360 may be designated to act as a specific repository for pre-formatted schemes or predetermined algorithms for associating certain characteristics of scanned data regarding images pre-printed on a class of substrates that may be received via an image source 310. At least one data storage device 360 may be separately designated to store custom marks that may be associated with a particular user's, or user agency's, desires for specific security markings on a particular class of substrates. Data storage device(s) 360 may include a random access memory (RAM) or another type of dynamic storage device that is capable of storing collected information, and separately of storing instructions for execution of system operations by, for example, processor(s) 350. Data storage device(s) 360 may also include a read-only memory (ROM), which may include a conventional ROM device or another type of static storage device that stores static information and instructions for processor(s) 350.

The exemplary system 300 may include one or more external data communication interfaces 370. The external data communication interface(s) 370 may be provided to facilitate communication with one or more separate user workstations and/or one or more separate image forming devices, when the exemplary system 300 is separately housed from either or both of the one or more separate user workstations and the one or more separate image forming devices. At least one external data communication interface 370 may be dedicated to one or both of the image source 310 and the image sink 320 to provide a conduit by which to communicate with those devices. The external data communication interfaces 370 may be provided to facilitate communication among the depicted devices, as required, to specifically carry out the function of printing haptic security marks, with or without visual enhancements, on the surface of the substrate according to a determined format.

The exemplary system 300 may include a security marking device 380 that may operate in conjunction with the processor(s) 350 to generate, format and control specific deposition of a marking material on a substrate via the image sink 320 to result in haptic security marks according to this disclosure. The security marking device 380 may be provided to specifically format the haptic security marks to be placed on a surface of the substrate according to a predetermined or user-directed scheme. This predetermined or user-directed scheme, as indicated above, may be based on the image forming scheme carried out by an image forming device to pre-print an underlying image on the substrate. The security marking device 380 may, for example, identify elements of the images pre-printed on the substrate, and mirror those images, or otherwise specifically format separate images, to be printed as the haptic security marks on the substrate. The security marking device 380 may also be provided to direct that, for example, colored layers of visual marks be interspersed within the layers of essentially transparent haptic security marks to provide composite haptic/visual security marks on the surface of the substrate.

All of the various components of the exemplary system 300, as depicted in FIG. 3, may be connected by one or more data/control busses 390. These data/control busses 390 may provide wired or wireless communication between the various components of the exemplary system 300 regardless of whether those components are housed within a user workstation, housed within an image forming device, or housed independently.

It should be appreciated that, although depicted in FIG. 3 as what appears to be an integral unit, as is outlined in detail above, the various disclosed elements of the exemplary system 300 may be arranged in any combination of sub-systems as individual components or combinations of components, integral to a single unit, or as separate components housed in one or more user workstations and/or one or more image forming devices, with which the exemplary system 300 is associated. Therefore, no specific configuration for the exemplary system 300 is to be implied by the depiction in FIG. 3.

Figure 4:
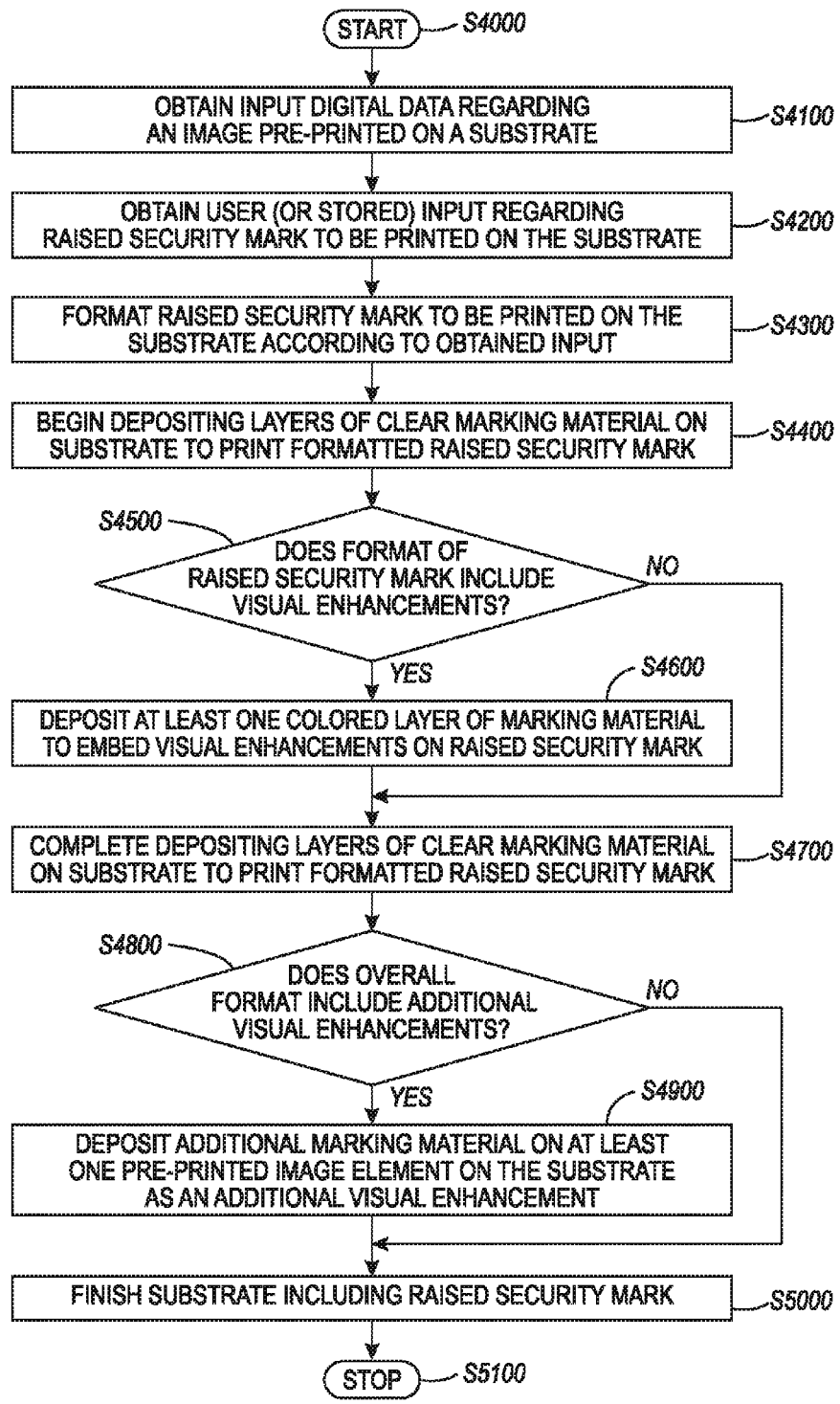
FIG. 4 illustrates a flowchart of an exemplary method for carrying into effect at least one of the composite or redundant security marking schemes for printing visual and/or haptic security markings on the surface of a document of value according to this disclosure.

The disclosed embodiments may include a method for using marking materials, including ultraviolet curable gel inks, and variable data digital printing techniques, to produce composite, redundant or special encoding on banknotes, documents of value and packaging by combining visual information with haptic printing and/or providing redundant encoding via haptic printing to produce redundant encoding and custom markings. FIG. 4 illustrates a flowchart of such an exemplary method. As shown in FIG. 4, operation of the method commences at Step S4000 and proceeds to Step S4100.

In Step S4100, digital data may be received, for example, from an image source, regarding an image pre-printed on a substrate. Such digital data may be received by, for example, scanning the images pre-printed on the substrate. An objective of obtaining input digital data in this manner may be for the method to replicate some portion of the input digital data as an initial format for a raised security mark to be disposed on the substrate. In case of currency, for example, the input digital data may be a scanned serial number for a particular bill, or group of bills. The method may isolate certain digits from the serial number and may use the isolated certain digits directly, or as manipulated by an algorithm, as a basis for formatting raised (haptic) security marks to be printed on the substrate. Operation of the method proceeds to Step S4200.

In Step S4200, a user input may be obtained regarding raised security marks to be printed on a substrate. The user input may be received, for example, via a common user input to a system for printing such raised security marks on substrates. When input digital data is obtained in the manner described in Step S4100, the user input may consist of manipulating that input digital data in some manner, according to a user's preference, as the obtained user input regarding the raised security mark to be printed on the substrate. Alternatively, a predetermined and/or pre-stored scheme or algorithm may be referenced to generate digital data regarding one or more raised security marks to be printed on a substrate. In embodiments, the predetermined and/or pre-stored scheme or algorithm may be used to manipulate input digital data obtained in the manner described in Step S4100. Exemplary embodiments of the disclosed security marking schemes, as discussed above, may dispose raised security marks that are (1) generated by a user or automatically by a predetermined scheme, the raised security marks bearing no relation to any underlying data pre-printed on a substrate, or (2) generated automatically based on input digital data related to an image pre-printed, which may be directly reproduced, or reproduced in a manner manipulated by manual input from the user or according to a stored manipulating scheme or algorithm, the raised security marks bearing a relation to the underlying data pre-printed on the substrate. Operation of the method proceeds to Step S4300.

In Step S4300, the raised security marks to be printed on the substrate may be formatted according to one or more of (1) features isolated from input digital data related to an image pre-printed on a substrate that is received by, for example, scanning the pre-printed substrate to obtain image data as the input digital data, (2) manual user inputs received via a common user interface, and (3) predetermined or pre-stored formatting schemes or algorithms. The formatting may include identifying, for example, that additional visual security features may be embedded in the raised security marks to form composite raised security marks. The formatting may include identifying the features isolated and extracted from the pre-printed image on the substrate and determining that the identified features should be overprinted to form redundant raised security marks on the substrate. Operation of the method proceeds to Step S4400.

In Step S4400, an image forming device may be directed to begin depositing layers of marking materials on a substrate to print the formatted raised security marks. The raised security marks may be printed using common marking materials. The raised marks are, however, preferably printed using inkjet printing methods that include depositing radiation curable gel inks, including a clear UV curable gel ink, on the surface of the substrate in a manner that does not obscure images already pre-printed on the substrate. The printing of the raised security marks may occur in a combined image forming device that first prints and finishes an underlying image on the substrate and then overprints the raised security marks on the substrate. Alternatively, the printing of the raised security marks may occur in a separate image forming device in which, for example, pre-printed substrates such as, for example, currency, may have finished images printed thereon. The pre-printed substrates may then be input into the raised security mark image forming device for further processing according to one or more of the above raised security mark printing schemes. Operation of the method proceeds to Step S4500.

Step S4500 is a determination step. In Step S4500, a determination is made whether the format for the raised security marks includes embedded visual enhancements.

If, in Step S4500, it is determined that the format for the raised security marks does not include embedded visual enhancements, operation of the method proceeds to Step S4700.

If, in Step S4500, it is determined that the format for the raised security marks does include embedded visual enhancements, operation of the method proceeds to Step S4600.

In Step S4600, depositing of layers of clear marking material on the substrate is temporarily suspended while one or more colored layers of marking material are printed on the partially formed raised security marks in a manner that will result in embedding colored visual enhancements represented by the images printed by the one or more colored layers of marking material in the raised security marks. In embodiments, the embedded colored visual enhancements may bear a relationship to the overall format of the raised security marks, e.g., include the same letters and/or numbers as a represented by the raised security marks, or include a feature that bears a reasonable relationship to the feature that is represented by the raised security marks. Operation of the method proceeds to Step S4700.

In Step S4700, depositing of the layers of clear marking material may continue to complete the process of printing the raised security marks on the substrate. Operation of the method proceeds to Step S4800.

Step S4800 is a determination step. In Step S4800, a determination is made whether the format for the raised security marks, as an overall format for the security markings on the substrate, includes a provision for additional visual enhancements. These additional visual enhancements may preferably take the form of overwriting the isolated and extracted features that were pre-printed on the substrate and formed the basis for the raised security marks with additional marking material to form additional redundant security marks on the surface of the substrate.

If, in Step S4800, it is determined that the format does not provide for additional visual enhancements, operation of the method proceeds to Step S5000.

If, in Step S4800, it is determined that the format does provide for additional visual enhancements, operation of the method proceeds to Step S4900.

In Step S4900, additional marking material may be deposited on at least one of the pre-printed image elements on the substrate that formed the basis for the format of the raised security marks in order to provide an additional visual (and haptic) security feature. Operation of the method proceeds to Step S5000.

In Step S5000, forming of the raised security marks on the substrate is completed, and finishing processing, as may be required, is undertaken such that an output finished substrate is produced that includes at least raised security marks in the form of haptic security features that provide composite and/or redundant crosschecks for an inspector to determine the genuineness of the document printed on the substrate. Operation the method proceeds to Step S5100, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components related to printing and overprinting substrates in image forming devices, and control of those printing and overprinting processes to provide a brief, general description of suitable processing means by which to carry into effect the disclosed raised image security marking schemes. Reference to these conventional components is made for familiarity and ease of understanding, and not by way of limitation.

Although not required, elements of the disclosed exemplary embodiments may be provided, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks, or implement particular data types, in support of the overall objective of the systems and methods according to this disclosure.

Those skilled in the art will appreciate that other embodiments of the disclosed subject matter may be practiced with many types of image forming devices, or combinations of image forming devices in many different configurations. Embodiments according to this disclosure may be practiced, for example, in network environments, where processing and control tasks may be performed according to instructions input at a user's workstation and/or according to predetermined schemes that may be stored in data storage devices and executed by particular image forming devices or combinations of image forming devices.

As indicated above, embodiments within the scope of this disclosure may include computer-readable media having stored computer-executable instructions or data structures that can be accessed, read and executed by one or more processors, for example, in one or more image forming devices. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to store desired program elements or steps in the form of accessible computer-executable instructions or data structures. When information is transferred or provided over a network or via another communications connection, whether wired, wireless, or in some combination of the two, the receiving processor properly views the connection as a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps. The exemplary depicted steps may be executed in any reasonable order to effect the objectives of the disclosed embodiments. No particular order to the disclosed steps of the method is necessarily implied by the depiction in FIG. 4, and the accompanying description, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure. For example, the principles of the disclosure may be applied to each individual image forming device of a plurality of image forming devices, widely deployed and connected to any number of communications interfaces. In such instances, each image forming device may include some portion of the disclosed system and execute some portion of the disclosed method.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:

1. A method for controlling printing of raised security marks on a substrate, comprising:
    formatting, with a processor, one or more raised security marks to be printed using clear marking materials on a substrate;
    supplementing the one or more raised security marks by providing at least one visual enhancement;
    printing the one or more raised security marks and the at least one visual enhancement on the substrate; and
    outputting a finished substrate including the one or more raised security marks in the at least one visual enhancement.

2. The method of claim 1, the at least one visual enhancement being at least one visually perceptible element printed with one or more color ink layers in a manner that the visually perceptible element is embedded in the one or more raised security marks.

3. The method of claim 2, the at least one visually perceptible element including image content that is related to the image content of the one or more raised security marks.

4. The method of claim 2, the at least one visually perceptible element being formatted to include a same alphanumeric symbol as an alphanumeric symbol presented by the one or more raised security marks.

5. The method of claim 1, further comprising:
    scanning an image that is pre-printed on the substrate to obtain input digital image data; and
    isolating at least one element from the scanned image by extracting from the input digital image data extracted image data regarding the isolated at least one element,
    the formatting of the one or more raised security marks being based on the isolated at least one element from the scanned image.

6. The method of claim 5, the at least one visual enhancement being provided by separately overwriting the isolated at least one element from the scanned image with additional marking material.

7. The method of claim 5, the formatting of the one or more raised security marks having a direct visual correlation with the isolated at least one element from the scanned image.

8. The method of claim 5, the formatting of the one or more raised security marks being based on manipulating the extracted image data to provide the one or more raised security marks with a format that relates to the isolated at least one element from the scanned image according to a predetermined relationship.

9. The method of claim 1, the one or more raised security marks being formatted based on at least one of a manual user input received via a user interface and a predetermined formatting scheme for the one or more raised security marks that is read from a digital data storage device.

10. The method of claim 9, the one or more raised security marks being custom marks provided by a user to be commonly printed on a group of substrates, the one or more custom marks bearing no relationship to other images printed on the substrate.

11. The method of claim 1, the printing of the one or more raised security marks comprising inkjet printing using a clear ultraviolet curable gel ink.

12. A system for controlling printing of raised marks on a substrate, comprising:
    a raised mark formatting device that formats one or more raised security marks to be printed using clear marking materials on a substrate and at least one visual enhancement; and
    a processor that is programmed to direct an image forming device to print the formatted one or more raised security marks and the at least one visual enhancement on the substrate.

13. The system of claim 12, the at least one visual enhancement being at least one visually perceptible element printed with one or more color ink layers in a manner that the visually perceptible element is embedded in the one or more raised security marks.

14. The system of claim 3, the at least one visually perceptible element including image content that is related to the image content of the one or more raised security marks.

15. The system of claim 14, the at least one visually perceptible element being formatted to include a same alphanumeric symbol as an alphanumeric symbol presented by the one or more raised security marks.

16. The system of claim 1, further comprising a scanner that scans an image that is pre-printed on the substrate to obtain input digital image data,
    the processor being further programmed to isolate at least one element from the scanned image by extracting from the input digital image data extracted image data regarding the isolated at least one element and to format the one or more raised security marks based on the isolated at least one element from the scanned image.

17. The system of claim 16, the processor being further programmed to cause the image forming device to separately overwrite the isolated at least one element from the scanned image with additional marking material to produce the formatted at least one visual enhancement.

18. The system of claim 12, the processor formatting the one or more raised security marks based on at least one of a manual user input received via a user interface and a predetermined formatting scheme for the one or more raised security marks that is read from a digital data storage device.

19. The method of claim 9, the one or more raised security marks being custom marks provided by a user to be commonly printed on a group of substrates, the one or more custom marks bearing no relationship to other images printed on the substrate.

20. A non-transitory computer-readable medium storing instructions which, when executed by a processor, cause the processor to execute the steps of a method comprising:
    formatting one or more raised security marks to be printed using clear marking materials on a substrate;
    supplementing the one or more raised security marks by providing at least one visual enhancement;
    printing the one or more raised security marks and the at least one visual enhancement on the substrate; and
    outputting a finished substrate including the one or more raised security marks in the at least one visual enhancement.

* * * * *